United States Patent
Bramham et al.

[11] Patent Number: 6,165,092
[45] Date of Patent: Dec. 26, 2000

[54] GUIDE ASSEMBLY FOR A BICYCLE

[76] Inventors: Benjamin Bramham, 108 Cunningham St., Yorkeys Knob, Cairns, Queensland, 4878, Australia; Antony Morana, 61 Survey St., Smithfield, Smithfield, Queensland, 4878, Australia

[21] Appl. No.: 09/147,841
[22] PCT Filed: Sep. 18, 1997
[86] PCT No.: PCT/AU97/00614
 § 371 Date: Mar. 18, 1999
 § 102(e) Date: Mar. 18, 1999
[87] PCT Pub. No.: WO98/12102
 PCT Pub. Date: Mar. 26, 1998

[30] Foreign Application Priority Data

Sep. 18, 1996 [AU] Australia .................. PO2378

[51] Int. Cl.[7] ............................. F16H 7/12; F16H 7/20
[52] U.S. Cl. ...................................... 474/134; 474/165
[58] Field of Search .................... 474/134, 139, 474/144, 147, 165

[56] References Cited

U.S. PATENT DOCUMENTS

| | | | |
|---|---|---|---|
| 4,141,245 | 2/1979 | Brandstetter | 474/134 |
| 4,479,660 | 10/1984 | Pattison | 474/134 |
| 5,221,236 | 6/1993 | Raymer et al. | 474/165 |
| 5,613,918 | 3/1997 | Fleischman | 474/134 |
| 5,725,450 | 3/1998 | Huskey | 474/134 |

FOREIGN PATENT DOCUMENTS

| | | |
|---|---|---|
| 19165 | of 1924 | Australia . |
| 425777 | 4/1935 | United Kingdom . |
| 2092705 | 8/1982 | United Kingdom . |

Primary Examiner—David A. Bucci
Assistant Examiner—Matthew A. Kaness
Attorney, Agent, or Firm—Hoffman, Wasson & Gitler

[57] ABSTRACT

A guide assembly for a bicycle chain is fitted to the crank or front chain ring and remains in position as the chain ring rotates. The assembly has chain guide assemblies to stop the chain from coming off the chain ring. By not having the assembly attached to the frame, but instead to the chain ring or crank, the assembly can be used on a large number of different makes of bicycles.

12 Claims, 4 Drawing Sheets

GUIDE ASSEMBLY FOR A BICYCLE

FIELD OF THE INVENTION

This invention relates to a guide assembly to guide and assist in maintaining a chain over a chain ring. The guide assembly will be described with reference to its use on bicycles but it should be appreciated that the invention is not limited to the same.

BACKGROUND ART

Bicycles have front and rear chain rings about which a bicycle chain passes. The rear chain ring can be a single ring or a number of axially spaced rings of different diameters, thereby allowing various speed ratios to be obtained. The front chain ring is attached to a crank with the crank being attached to pedals. Rotation of the crank causes the chain ring to rotate.

With certain bicycles, and especially mountain bikes, there is a possibility that the chain becomes dislodged from the front chain ring, especially when rough riding. Rough riding causes the chain to rattle and move and there is an increased possibility that the chain can become suddenly dislodged from the chain ring. This can result in injury to the rider, and requires the chain to be re-positioned before further riding can take place.

Guides to guide and assist in maintaining the chain in engagement with the front chain ring are known. Typically, the guides consist of a first upper guide which is adjacent where the chain initially engages the chain ring, and a second bottom guide which is positioned adjacent where the chain disengages from the chain ring. While these guides are already known, the principle disadvantage with them is that they are attached directly to the bicycle frame. The guides need to be precisely positioned to work properly, and therefore there is a high skill required in attaching the guides to the bicycle frame.

This becomes difficult with the hundreds of different frame designs and dimensions. It is found that certain frame designs cannot easily provide a support for the guides. It is also found that a great number of adjustments are required to position the guides effectively. It is also found that modification of existing guides is required to position the guides effectively.

OBJECT OF THE INVENTION

The present invention is directed to a guide assembly which, rather than being attached to a frame, is attached relative to the chain ring.

It is an object of the invention to provide a guide assembly which may overcome the abovementioned disadvantages or provide the public with a useful or commercial choice.

In one form, the invention resides in a guide assembly to guide a chain over a rotatable chain ring, the guide assembly comprising a first guide member adjacent an initial chain engaging position on the chain ring, a second guide member adjacent a chain disengaging position on the chain ring, a brace to which the guides are connected, the brace being rotatably connected relative to the chain ring and adapted to stay substantially in place as the chain ring rotates.

In another form, the invention resides in a guide assembly to guide a chain over a rotatable chain ring, the guide assembly comprising a first guide member attachment point adjacent an initial chain engaging position on the chain ring, a second guide member attachment point adjacent a chain disengaging position on the chain ring, a brace containing the guide attachment points, the brace being rotatably connected relative to the chain ring and adapted to stay substantially in place as the chain ring rotates.

In this manner, by having the guides mounted or mountable to a brace rather than directly to the frame, the dimensions and style of the frame can vary.

If the assembly is used on bicycles, the rotatable chain ring is typically the forward chain ring which is rotated by the bicycle pedals.

The first guide member may be of a known type and/or may comprise a pair of opposed plates between which the chain can pass, the plates being inter-connected by sheaves, pulleys or wheels.

The second guide member may be of a conventional type and/or may comprise a pulley or sheave over which the chain may pass.

Typically, the first guide member is positioned immediately adjacent where the chain initially contacts the chain ring with the guide member properly centering the chain onto the chain ring thereby reducing inadvertent displacement of the chain from the chain ring.

Suitably, the second guide member is positioned slightly above the lowermost portion of the chain ring such that the chain passes over the lowermost portion and slightly up from it before becoming disengaged.

The brace may comprise a mounting plate. The mounting plate may be formed from metal, plastics, composites or any other suitable material. The mounting plate is rotatably connected relative to the chain ring such that as the chain ring rotates, the mounting plate does not. One way this can be achieved is by having a bush arrangement or bearing arrangement to allow the chain ring to rotate relative to the brace.

If desired, the brace can be attached to a portion of the frame. The attachment may be in the form of an anchor. If desired, the attachment may be in the form of a spring such that the brace can exhibit a slight degree of rotative movement relative to the rotatable chain ring.

The guide assemblies may be formed separately and attached to the brace, or may be formed integrally with the brace.

In another form, the invention resides in a brace to position a first and second guide member in place.

BRIEF DESCRIPTION OF THE DRAWINGS

An embodiment of the invention will be described with reference to the accompanying drawings in which.

BEST MODE

Figure 1:
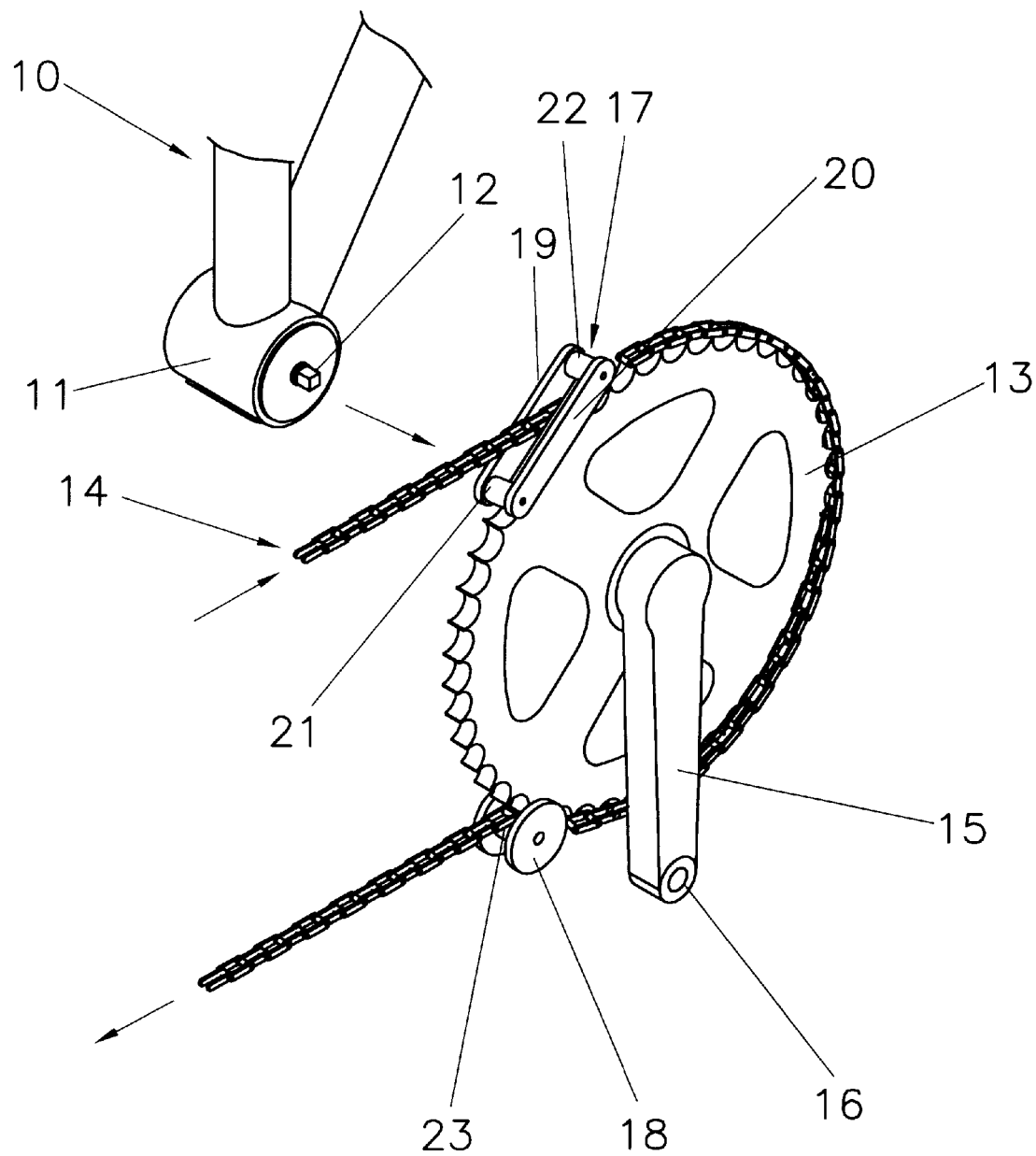
FIG. 1 is an exploded view of a forward chain ring on a bicycle.

Referring initially to FIG. 1, there is shown a lower portion of a bicycle frame 10. The lower portion terminates in a bottom bracket 11 through which an axle 12 passes, the axle being mounted for rotation within bracket 11. Attached to axle 12 is a forward chain ring 13. Chain ring 13 has peripheral teeth, as is common with bicycles. Attached to chain ring 30 is a chain 14 more or less of conventional design which engages with chain ring 13 adjacent an upper portion and disengages with chain ring 13 adjacent a lower portion.

Chain ring 13 is rotated through a crank 15 to which pedals (not shown) can be attached through mountings 16. Pushing on the pedals causes crank 15 to rotate which in turn causes chain ring 13 to rotate.

To keep chain 14 in place, an upper first guide member 17 is provided, as is a second lower guide member 18. Guide members 17 and 18 can be of known design. First guide member 17 consists of a pair of spaced apart parallel metal plates 19, 20 which are connected together by sheaves or pulleys 21, 22. Chain 14 passes between plates 19 and 20 and is guided onto an upper part of chain ring 13.

Second guide member 18 functions to reduce chain slap. Second guide member 18 comprises a sheave or pulley 23 over which chain 14 can pass. The second guide member is slightly spaced upwardly from the bottom dead center of the chain ring such that the chain maintains a bit of tension.

Figure 2:
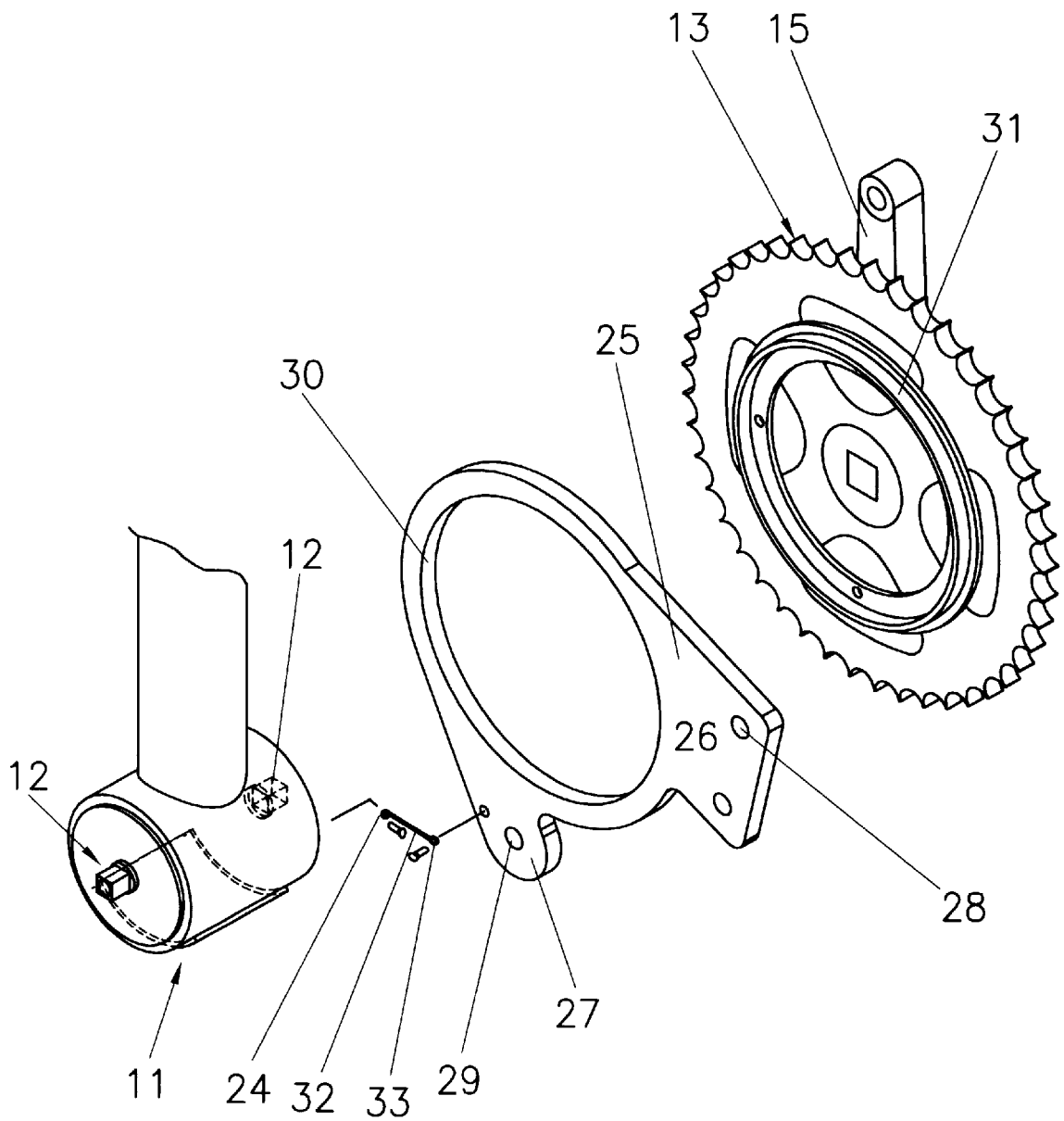
FIG. 2 is an exploded view showing the brace and its attachment to a chain ring according to a first embodiment

FIG. 2 shows the assembly in greater detail. The guide members 19 and 18 (see FIG. 1) are attached to a brace 25 which is in the form of a V shaped mounting plate. The mounting plate has two arms 26, 27 to which the guide members can be attached, for instance, by fasteners passing through openings 28, 29. It can be seen that brace 25 can precisely position the guide members 18, 19.

Brace 25 has a central opening which functions as a bush 30. The opening sits on top of a bush seat 31, the bush seat being attached to the inside of chain ring 13. Thus, as chain ring 13 rotates, brace 25 does not by virtue of it being rotatably mounted relative to chain ring 13. Of course, the bush is an example only and bearings or other forms of mountings can also be used to mount brace 25 relative to chain ring 13.

If desired, an anchor 32 is provided. Anchor 32 has one end 33, which mounts to brace 25, and another end 34 which mounts to bracket 11. Screws can be used to mount anchor 32 in place. Optionally, anchor 32 can comprise a spring which will allow brace 25 to rock slightly to and fro, the amount of movement being determined by the stiffness of the spring. Typically, a 15% movement can be obtained if the anchor consists of a spring or like member.

Figure 3:
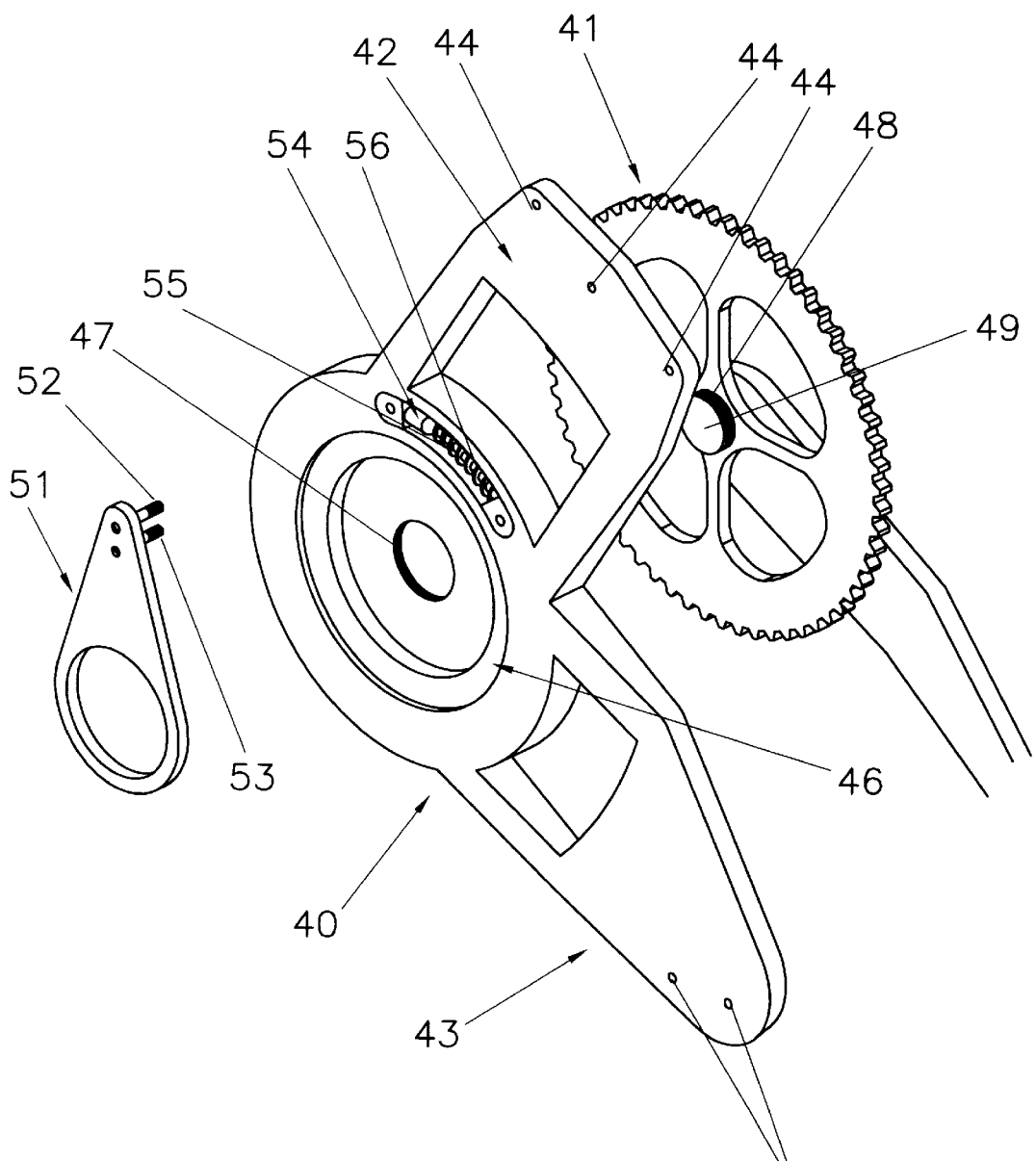
FIG. 3 is an assembly according to a second embodiment of the invention
Figure 4:
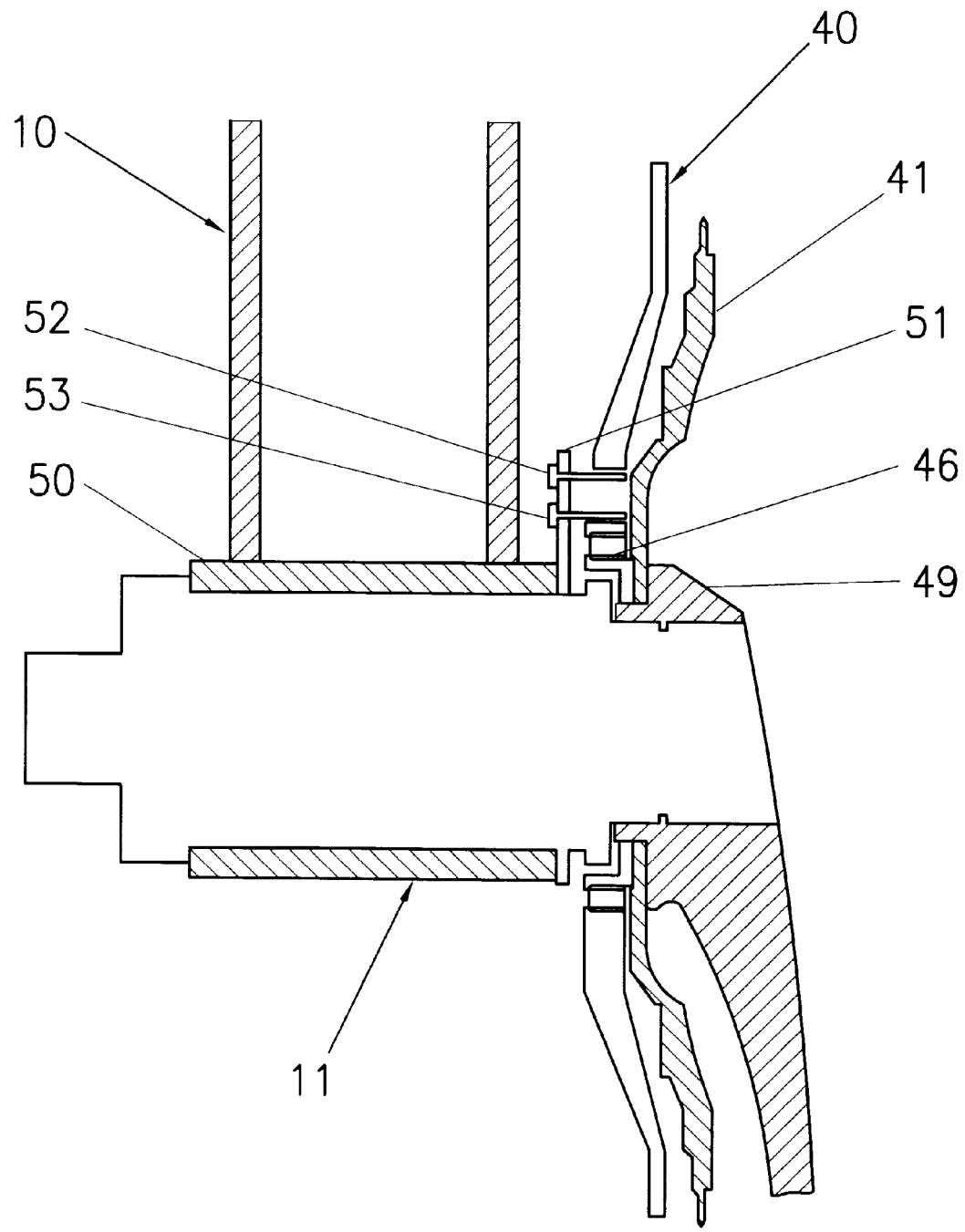
FIG. 4 is a section view of FIG. 3

FIGS. 3 and 4 illustrate a second embodiment of the invention. The main difference in this embodiment is the way that the brace 40 is attached to the chain ring 41. Brace 40 has two arm members 42,43 to which the guides (not shown) can be attached using fasteners which pass through openings 44,45. Brace 40 has a central hole in which a bearing 46 is fitted. Bearing 46 has an inner member 47 which screw threads onto the thread 48 on crank 49. The outer part of bearing 46 is fitted to the brace, the result being that the brace remains stationary as the crank rotates.

Brace 40 is pinned to the bottom bracket 50 of the bicycle frame through anchor 51. Anchor 51 is press fitted to bracket 50 as illustrated in FIG. 4, and has two screw pins 52, 53 which pass into a slot 54 on brace 40. The pins 52, 53 pass along each side of a guide rod 55 in slot 54, which supports a spring 56. This arrangement allows the brace 40 to rock slightly to and fro.

It can be seen that the assembly allows the guides to be mounted relative to a chain ring in a simple manner. The brace also functions to precisely mount the guides in place and as the guides are not directly mounted to the bicycle frame, there is little concern as to the type and variety of frame that can be used.

It should be appreciated that various other changes and modifications can be made to the embodiment described without departing from the sprit and scope of the invention as claimed.

What is claimed is:

1. A bicycle comprising:
    a front chain ring and a crank, said crank being rotatable to rotate said front chain ring,
    a chain which engages with said chain ring, and
    a guide assembly to guide said chain onto and around said chain ring, said guide assembly being mounted to one of said crank and said chain ring, said guide assembly comprising:
        a brace having an inner part fitted to one of said crank and said chain ring to rotate with one of said crank and said chain ring, and an outer part which is rotatably attached to said inner part such that said outer part does not rotate with said one of said crank or said chain ring, and
        a first and second chain guide member attached to said brace.

2. A bicycle as recited in claim 1, wherein said first chain guide member is adjacent a position where said chain initially contacts said chain ring and functions to properly center said chain on to said chain ring so that inadvertent displacement of said chain from said chain ring is reduced, and said second guide member is positioned slightly above a lowermost portion of said chain ring such that said chain passes over said lowermost portion of said chain ring and slightly above it before becoming disengaged.

3. A bicycle as recited in claim 2, further comprising an anchor means to anchor said outer part of said brace against rotation with said crank.

4. A bicycle as recited in claim 3, wherein said anchor means comprises a biasing means to allow said outer part to exhibit limited rocking motion relative to said chain.

5. A bicycle as recited in claim 2, wherein said inner part of said brace comprises a circular ring mounted to said chain ring and having an outer bearing surface, and said outer part of said brace has a circular opening formed with a bearing surface and which rotates about said bearing surface of said circular ring.

6. A bicycle as recited in claim 2, wherein said chain ring is attached to said one end of said crank, said one end of said crank being threaded, said outer part of said brace having a hole extending therethrough, a bearing being fitted in said hole, said bearing having an inner part which comprises said inner part of said brace, and which has a threaded opening and is threadably engaged with said one end of said crank, and an outer part which rotates relative to said inner part and which is attached to said outer part of said brace.

7. A bicycle chain guide assembly adapted to be mounted to one of a rotatable crank and chain ring of a bicycle and to guide a bicycle chain onto and around said chain ring, said guide-assembly comprising a brace which has an inner part adapted to be fitted to the crank and chain ring to rotate with said one of said crank and said chain ring, and an outer part which is rotatably attached to said inner part such that said outer part does not rotate with said one of said crank and said chain ring, and attachment means to attach a first and second chain guide member to said brace.

8. A bicycle chain assembly as recited in claim 7, wherein said first and second chain guide member are attached to said attachment means, said first chain guide member being disposed adjacent a position where said chain initially contacts said chain ring and functions to center said chain on to said chain ring to reduce inadvertent displacement of said chain from said chain ring, and said second chain guide member is positioned slightly above a lowermost portion of said chain ring such that said chain passes over said lowermost portion of said chain ring and slightly up from it before becoming disengaged.

9. An assembly as recited in claim 8, further comprising an anchor means to anchor said outer part of said brace against rotation with said crank.

10. A bicycle chain guide assembly as recited in claim 9, wherein said anchor means comprises a biasing means to allow said outer part to exhibit limited rocking motion relative to said chain.

11. A bicycle chain guide assembly as recited in claim 8, wherein said inner part of said brace comprises a circular ring which is adapted to be mounted to said chain ring and which has an outer bearing surface, and said outer part of said brace has a circular opening formed with a bearing surface and which rotates about said bearing surface of said circular ring.

12. A bicycle guide assembly as recited in claim 8, wherein said chain ring is attached to one end of said crank, said one end being threaded, said outer part of said brace having a hole extending therethrough, a bearing being fitted in said hole, said bearing having an inner part which comprises said inner part of said brace, and which has a threaded opening and which is adapted to be threadedly engaged with said one end of said crank, and an outer part which rotates relative to said inner part and which is attached to said outer part of said brace.

\* \* \* \* \*